United States Patent
Teranishi et al.

(10) Patent No.: US 6,503,630 B1
(45) Date of Patent: Jan. 7, 2003

(54) GLASS ARTICLE, METHOD FOR HANDLING GLASS ARTICLE AND HANDLING TOOL FOR GLASS ARTICLE

(75) Inventors: Toyoyuki Teranishi, Osaka (JP); Hisashi Ogawa, Osaka (JP); Hiroaki Kobayashi, Osaka (JP); Jun Hasegawa, Osaka (JP); Kazuhiro Doushita, Osaka (JP); Hiroaki Yamamoto, Osaka (JP)

(73) Assignee: Nippon Sheet Glass Co., LTD, Osaka (JP)

( * ) Notice: Subject to any disclaimer, the term of this patent is extended or adjusted under 35 U.S.C. 154(b) by 0 days.

(21) Appl. No.: 09/831,330

(22) PCT Filed: Nov. 9, 1999

(86) PCT No.: PCT/JP99/06237

§ 371 (c)(1), (2), (4) Date: Jul. 9, 2001

(87) PCT Pub. No.: WO00/27770

PCT Pub. Date: May 18, 2000

(30) Foreign Application Priority Data

Nov. 10, 1998 (JP) ............................................. 10-319444
Feb. 2, 1999 (JP) ............................................. 11-024938

(51) Int. Cl.[7] ........................ B32B 17/06; B65G 49/06; C03C 17/34

(52) U.S. Cl. ...................... 428/429; 294/64.1; 414/800; 427/154; 427/155; 428/36.8; 428/421; 428/423.1; 428/447; 428/492; 428/522

(58) Field of Search ........................ 294/64.1; 414/800; 428/36.8, 421, 423.1, 429, 447, 492, 522; 427/154, 155

(56) References Cited

U.S. PATENT DOCUMENTS

5,026,597 A    6/1991  Franz et al. ................. 428/323
5,418,006 A  *  5/1995  Roth et al. ................... 427/154

FOREIGN PATENT DOCUMENTS

| JP | 6-340865 | 12/1994 |
| JP | 7-14816 | 1/1995 |
| JP | 9-104858 | 4/1997 |
| WO | WO 95/34608 | 12/1995 |

* cited by examiner

Primary Examiner—D. S. Nakarani
(74) Attorney, Agent, or Firm—Merchant & Gould P.C.

(57) ABSTRACT

A glass article provided with an organic functional film on a surface thereof of the present invention is characterized in that a coating film removable with a solvent is formed on at least a portion of the functional film. A method for handling a glass article with a handing tool of the present invention is characterized in the a glass article is handled with a handling tool via a coating film removable with a solvent between a surface of the tool in contact with the glass article and a surface of the glass article.

33 Claims, 4 Drawing Sheets

GLASS ARTICLE, METHOD FOR HANDLING GLASS ARTICLE AND HANDLING TOOL FOR GLASS ARTICLE

FIELD OF THE INVENTION

The present invention relates to a glass article, a method for handling a glass article, a handling tool for a glass article and a spacing tool for glass articles. More specifically, the present invention relates to a technique used for a glass article provided with an organic functional film, which prevents a component of the organic functional film from adhering to something in contact with the glass article.

Furthermore, the present invention relates to a technique in a method for handling glass articles that prevents a component of a surface of a member of a glass-article-handling tool in contact with a glass article from adhering onto the surface of the glass article, or an attachment on the surface of the glass article from re-adhering (transferring) onto the surface of the glass-article-handling tool in contact with the glass article.

Furthermore, the present invention relates to a technique used with a glass-article-handling tool and a glass-article-spacing tool that prevents a contaminant adhered onto a surface of the handling tool or the spacing tool in contact with a glass article from adhering to a surface of another glass article.

BACKGROUND OF THE INVENTION

A glass sheet, which is an example of a glass article, is widely used for a window sash for buildings or as a window glass for automobiles. Such glass sheets are produced in a glass factory and transported to a sash factory so as to be assembled to form a window sash. Alternatively, glass sheets are transported to an automobile factory to be incorporated into an automobile. In these cases, the glass sheets 10 are commonly handled by automatic machines such as robots 7 (see FIG. 4).

In the case where a robot handles glass sheets, a chuck is commonly used to pick up a glass article. In this operation, the component of the member of the chuck may adhere onto the surface of the glass article. Alternatively, dirt adhered on the surface of the chuck may re-adhere to a surface of another glass sheet. The removal of the dirt may require troublesome work.

In order to provide various properties to a glass sheet, various films may be formed on the surface of the glass sheet. A glass sheet provided with an organic functional film has been under development to provide the surface of the glass sheet with water repellency or hydrophilicity.

When this glass sheet is handled by a glass-article-handling tool, a component of the organic functional film adheres to a surface of the tool. Upon handling of another glass article with this tool, the adhered component of the organic functional film re-adheres to the glass article. In the case where this second glass sheet is an ordinary glass sheet that is not provided with an organic functional film, the following problem is caused. For example, an organic functional film that provides water repellency has high adhesion. Therefore, the removal of the component of the organic functional film re-adhered onto the ordinary glass sheet requires troublesome work.

Generally, on a production line of automobiles, automobiles of a variety of types or specifications are produced. Consequently, various window glass sheets, e.g., glass sheets having water repellency and ordinary glass sheets, are supplied onto the line. Therefore, the above-described problem may be caused.

Furthermore, for example, when glass sheets are stored, transported or packaged, a spacing tool such as a "comb" and a spacer for retaining an interval between glass sheets are in contact with the surfaces of the glass sheets (see FIG. 3). In this case, a dirt on the surface of the spacing tool may adhere to the glass sheet.

Furthermore, when the stored glass sheets are provided with the organic functional films on the surfaces thereof, the same problem as described above is caused. More specifically, the component of the organic functional film adheres onto the surfaces of the comb or the spacing tool, and then re-adheres to other glass sheets.

One solution to the above-described problem is to change the material of the chuck so as to reduce the component of the organic functional film adhered to the surface of the chuck.

Preliminary Experiment

The re-adhesion of a component of a water-repellent film was investigated with respect to chucks composed of the following materials:

(1) neoprene rubber;

(2) neoprene rubber and tetrafluoroethylene coated material;

(3) fluorine-based rubber;

(4) urethane-based rubber;

(5) foamed nitrile rubber.

The chuck composed of each of the above-listed materials was pressed tightly onto a glass sheet coated with a water-repellent agent that will be described later. Then, each chuck was pressed onto another glass sheet that had been washed. Water was applied to the pressed portion of the glass sheet. Then, the level of the adhesion of the component of the water-repellent agent was evaluated by observing the level of repellency against water.

As a result, repellency against water was observed in all of the chucks regardless of the material. In other words, changing the material of the chuck failed to prevent the re-adhesion of the component of the water-repellent film.

Japanese Laid-Open Patent Publication (Tokkai-Hei) No. 6-340865 discloses "a substrate whose surface is coated with a water-soluble salt", which is a glass substrate, and "a method for cleaning a substrate comprising the steps of coating a surface of a substrate with a soluble salt to form a film of the soluble salt, and cleaning a dirt adhered onto the surface of the film with water and/or a surfactant".

The inventions described in this publication provide "a substrate and a method for cleaning the same that allow an adhered dirt to be removed sufficiently in a simpler manner than conventionally". More specifically, alkali salts such as sodium tripolyphosphate, sodium sesquicarbonate, sodium hydrogencarbonate, sodium carbonate, sodium tetraborate and potassium tetraborate are disclosed as the water-soluble salt. An aqueous solution of these salts is directly applied onto the surface of the glass substrate.

Japanese Laid-Open Patent Publication (Tokkai-Hei) No. 7-14816 discloses "a method for cleaning a thin film forming tool comprising the steps of forming a film composed of a water-soluble material in a thin film forming tool beforehand, and removing a dirt by washing the dirt-adhered film of the thin film forming tool with water after the tool is used to form a thin film".

As the water-soluble material, "halogenide, carbonate, bicarbonate, nitride, sulfate, phosphate, silicate, organic salt, double salt of the salts listed above, organic acid, monosaccharide, and polysaccharide" are listed, and it is described that "phosphate (e.g., sodium tripolyphosphate), and borate (e.g., sodium tetraborate) are most preferable".

Japanese Laid-Open Patent Publication (Tokkai-Hei) No. 9-104858 discloses "a dirt-adhesion-preventing composition comprising a hydrophilic substance having a film forming ability and glycoside" on a glass or plastic surface.

SUMMARY OF THE INVENTION

Therefore, with the foregoing in mind, it is an object of the present invention to provide a glass article provided with an organic functional film that prevents the component of the organic functional film from re-adhering to something in contact with the surface of the glass article.

It is an object of the present invention to provide a method for handling glass articles that prevents an attachment on a surface of a glass article from re-adhering to another glass article via a surface of a glass-article-handling tool in contact with the glass articles.

It is an object of the present invention to provide a method for handling glass articles that prevents a contaminant adhered onto a surface of a handling tool from re-adhering to another glass article.

Some materials for a surface of a glass-article-handling tool in contact with a glass article may let the contact leave marks on the surface of the glass article.

Therefore, it is an object of the present invention to provide a method for handling glass articles that prevents a component of a material of a surface of a glass-article-handling tool in contact with a glass article from adhering onto the surface of the glass article.

Furthermore, it is an object of the present invention to provide a glass-article-handling tool and a glass-article-spacing tool that prevent an attachment adhered onto a surface of a member of the handling tool or the spacing tool in contact with a glass article from re-adhering to another glass article.

The present invention utilizes a coating film removable with a solvent to prevent the adhesion of a component of an organic functional film that is hardly removed. More specifically, in order to prevent the adhesion of the component of the organic functional film, a coating Mm that can be removed with a solvent is intentionally adhered to a surface of a handling tool in contact with a glass article.

In a first embodiment of the present invention, it is sufficient to form a coating film removable with a solvent on at least one portion of the organic functional film of a glass article in contact with a handling tool.

More specifically, the first embodiment of the present invention is directed to a glass article provided with an organic functional film on a surface thereof, where a coating film removable with a solvent is formed on at least in a portion of the functional film.

In the glass article of the first embodiment, it is preferable that the organic functional film is substantially insoluble in the solvent.

In the glass article of the first embodiment, the coating film is preferably formed by applying a compound soluble in a solvent selected from the group consisting of water and alcohol solvents containing one to five carbon atoms.

In the glass article of the first embodiment, the coating film is preferably formed by applying a surfactant.

In the glass article of the first embodiment, the surfactant is preferably selected from the group consisting of an anionic surfactant and a nonionic surfactant.

In the glass article of the first embodiment, the organic functional film is preferably water-repellent.

A second embodiment of the present invention is directed to a method for handling a glass article with a handling tool, where the glass article is handled with the handling tool via a coating film, which is removable with a solvent, between a surface of the tool in contact with a surface of the glass article and the surface of the glass article.

In the method for handling a glass article of the second embodiment, the coating film is preferably formed on the surface of the glass article.

In the method for handling a glass article of the second embodiment, the coating film is preferably formed on the surface of the tool in contact with the surface of the glass article.

In the method for handling a glass article of the second embodiment, the glass article preferably includes an organic functional film on a surface thereof.

In the method for handling a glass article of the second embodiment, it is preferable that the organic functional film is substantially insoluble in the solvent.

In the method for handling a glass article of the second embodiment, the coating film is preferably formed by applying a compound soluble in a solvent selected from the group consisting of water and alcohol solvents containing one to five carbon atoms.

In the method for handling a glass article of the second embodiment, the coating film is preferably formed by applying a surfactant.

In the method for handling a glass article of the second embodiment, the surfactant is preferably selected from the group consisting of an anionic surfactant and a nonionic surfactant.

In the method for handling a glass article of the second embodiment, the organic functional film is preferably water-repellent.

A third embodiment of the present invention is directed to a method for handling a plurality of glass articles successively with a handling tool. Some of the plurality of glass articles are provided with organic functional films on surfaces thereof, and a coating film removable with a solvent is formed on each of the organic functional films. The glass articles are handled with a handling tool while allowing the coating film to adhere to a surface of the handling tool to prevent a contaminant brought to the surface of the handling tool from the organic functional film from adhering to the other glass articles.

In the method for handling a glass article of the third embodiment, it is preferable that the organic functional film is substantially insoluble in the solvent.

In the method for handling a glass article of the third embodiment, the plurality of glass articles preferably include glass articles provided with the organic functional films and glass articles not provided with organic functional films.

In the method for handling a glass article of the third embodiment, the coating film is preferably formed by applying a compound soluble in a solvent selected from the group consisting of water and alcohol solvents containing one to five carbon atoms.

In the method for handling a glass article of the third embodiment, the coating film is preferably formed by applying a surfactant.

In the method for handling a glass article of the third embodiment, the surfactant is preferably selected from the group consisting of an anionic surfactant and a nonionic surfactant.

In the method for handling a glass article of the third embodiment, the organic functional film is preferably water-repellent.

A fourth embodiment of the present invention is directed to a glass-article-handling tool. A coating film removable with a solvent is formed on a surface of a member of the handling tool for contacting with a glass article.

In the glass-article-handling tool of the fourth embodiment, the member preferably includes a suction function.

In the glass-article-handling tool of the fourth embodiment, the coating film is preferably formed by applying a compound soluble in a solvent selected from the group consisting of water and alcohol solvents containing one to five carbon atoms.

In the glass-article-handling tool of the fourth embodiment, the coating film is preferably formed by applying a surfactant.

In the glass-article-handling tool of the fourth embodiment, the surfactant is preferably selected from the group consisting of an anionic surfactant and a nonionic surfactant.

A fifth embodiment is directed to a glass-article-spacing tool. A coating film removable with a solvent is formed on a surface of a member of the tool for contacting with a glass article.

In the glass-article-spacing tool of the fifth embodiment, the coating film is preferably formed by applying a compound soluble in a solvent selected from the group consisting of water and alcohol solvents containing one to five carbon atoms.

In the glass-article-spacing tool of the fifth embodiment, the coating film is preferably formed by applying a surfactant.

In the glass-article-spacing tool of the fifth embodiment, the surfactant is preferably selected from the group consisting of an anionic surfactant and a nonionic surfactant.

The present invention has the following advantages.

In the first embodiment of the present invention, the component of the organic functional film on the surface of the glass article is prevented from adhering to something that the glass article contacts. Furthermore, re-adhesion of the component to another thing is prevented.

In addition, when the coating film is formed by applying a compound soluble in a solvent selected from the group consisting of water and alcohol solvents, the coating film can be removed readily.

In addition, when the coating film is formed by applying a surfactant, the coating film can be removed readily. The surfactant preferably is selected from the group consisting of an anionic surfactant and a nonionic surfactant. In this case, even if the coating film is not completely removed, the marks are not noticeable because of its good wettability by water.

In the second embodiment of the present invention, the component of the functional film formed on the surface of the glass article or dirt adhered onto the surface is prevented from re-adhering to another glass article via the handling tool. Furthermore, the component of a surface of a member of the glass-article-handling tool in contact with the glass article is prevented from adhering to the surface of the glass article.

In the third embodiment of the present invention, the coating film adhered onto the surface of the handling tool prevents a contaminant on the surface of the handling tool from adhering to another glass article.

In the fourth and the fifth embodiments of the present invention, the component of the functional film formed on the surface of the glass article or a dirt adhered onto the surface can be prevented from re-adhering to another glass article via the handling tool.

These and other advantages of the present invention will become apparent to those skilled in the art upon reading and understanding the following detailed description with reference to the accompanying figures.

DETAILED DESCRIPTION OF THE INVENTION

Figure 1:
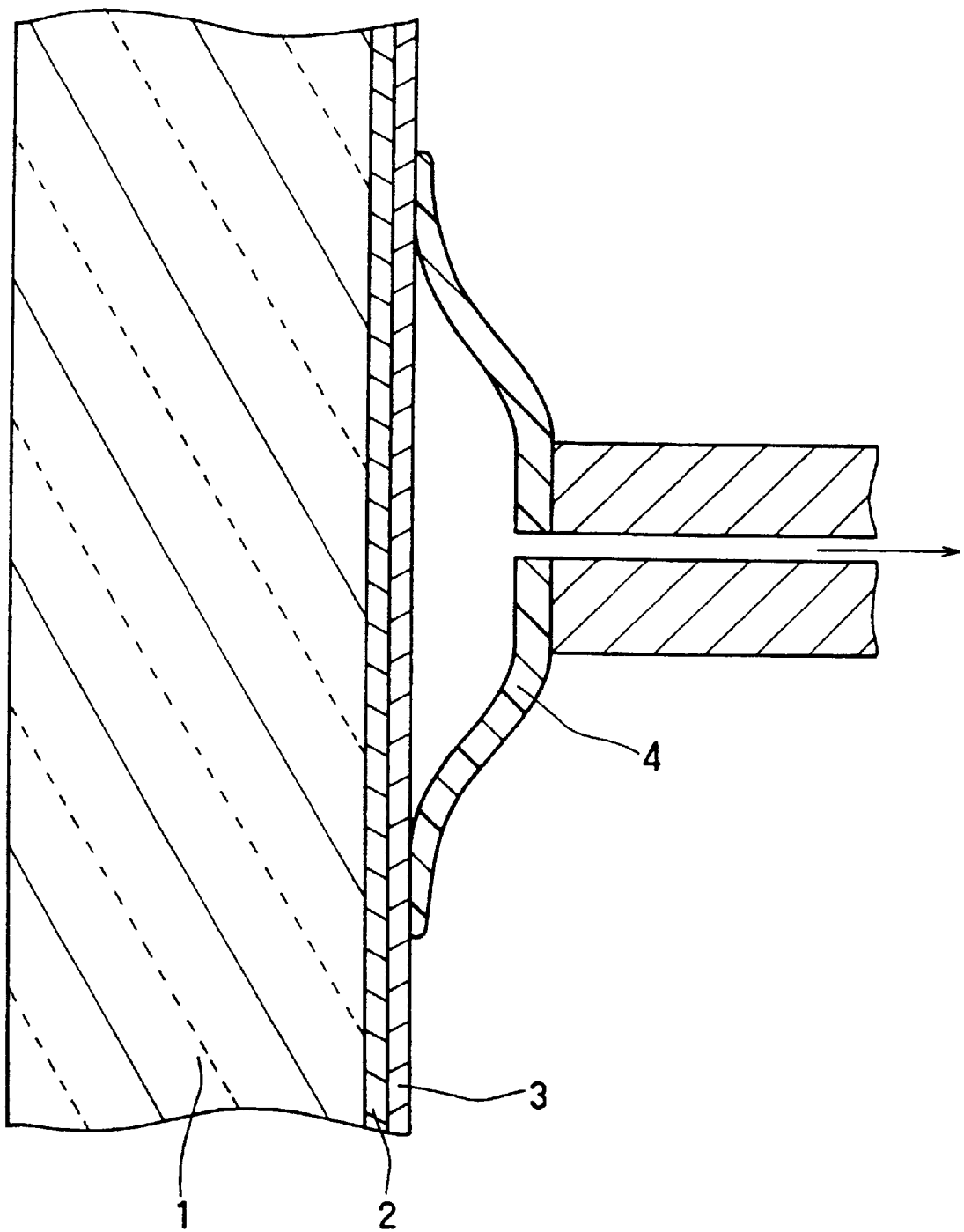
FIG. 1 is a view illustrating a first embodiment of the present invention.

Application of Coating Film onto Glass Surface
Formation of a Water-repellent Functional Film First, the formation of a water-repellent functional film, an example of an organic functional film 2 on a glass sheet 1, will be described with reference to FIG. 1.

A soda-lime silica glass sheet produced by a float glass process was prepared as a glass article. The glass sheet was processed into a predetermined shape, and washed with powders of cerium oxide as a polishing agent. Thereafter, the glass sheet was washed with pure water and dried. The glass sheet may be a flat glass or a bent and/or tempered glass.

Next, 1.3 g of heptadecafluorodecyl trimethoxysilane $(CF_3(CF_2)_7(CH_2)_2Si(OCH_3)_3$ produced by TOSHIBA SILICONE CO., LTD.) was dissolved in 40.6 g of ethyl alcohol $(C_2H_5OH)$, and the solution was stirred for about 1 hour. Thereafter, 0.808 g of ion exchanged water and 1.0 g of 0.1N hydrochloric acid were added to the solution, and the mixture was stirred for about 1 hour. Thus, a water-repellent agent was prepared.

The thus prepared water-repellent agent was applied to a cotton fabric so as to be applied onto a surface of the glass substrate. Thereafter, the glass substrate was wiped until the glass substrate became transparent. Thus, a glass sheet provided with a water-repellent functional film was produced. The thus produced glass sheet is referred to as a water-repellent glass sheet hereinafter.

Formation of a Coating Film

Hereinafter, a method for forming a coating film 3 removable with a solvent will be described. The coating film is preferably removed with a solvent in a simple manner.

Water and alcohol solvents are preferable as a solvent used for the removal of the coating film in view of the ease of handling, the safety and the cost. Water is most preferable in view of the cost.

Therefore, for the formation of the coating film, it is preferable to apply a compound that can be removed with water or alcohol solvents.

The coating film may be formed by applying the compound without being diluted. Alternatively, when the compound is a solid or has a high viscosity, the compound may be diluted with a solvent. When the compound is diluted with a solvent, the solvent may be water or an organic solvent such as alcohol, acetone, and ethyl acetate. It is preferable to use a non-toxic and risk-free solvent. For example, water or an alcohol solvent is used alone or in combination. Examples of alcohol solvents include methyl alcohol, ethyl alcohol, propyl alcohol, and butyl alcohol.

Specific examples of the compound include a surfactant. There are a cationic surfactant, an anionic surfactant, an amphoteric surfactant and a nonionic surfactant. Among them, an anionic surfactant and a nonionic surfactant can be used preferably in the present invention for the following reasons. The anionic and nonionic surfactants can be removed with water or the like readily when it is adhered onto a glass surface. Even if the surfactant remains on the glass surface, it is not noticeable because of its good wettability by water.

The following problems may be caused when a surface of a glass article provided with a water-repellent functional film as the organic functional film is to be coated. A coating forming solution may be repelled by the water-repellent functional film. Therefore, it is necessary to select a solvent and a surfactant so that the water-repellent functional film can be coated uniformly. In order words, a solvent having a small surface tension is preferable. An alcohol solvent that can be dried quickly after the coating is most preferable. Since a coating composition having a low solid concentration is repelled more readily, the solid concentration is preferably 1% or more, more preferably 10% or more.

The application method can be any known method, for example, methods using an apparatus such as a spin coater, a roll coater, a spray coater, and a curtain coater, a dip coating method, a flow coating method, various printing methods such as screen printing, gravure, and curved surface printing, or a manual method using a fabric or a brush impregnated with a solution. In view of workability, the manual method in which a solvent is applied while being dried is preferable.

Examples of the anionic surfactant include alkyl ether sulfosuccinate such as sodium dialkyl sulfosuccinate, alkyl ether sulfate, alkyl ether phosphate, alkyl ether carboxylate, alkyl benzene sulfonate such as sodium dodecylbenzenesulfonate, and acyl methyl taurate. Among them, alkyl ether sulfosuccinate, alkyl ether sulfate, and acyl methyl taurate can be used preferably. Examples of alkyl ether sulfosuccinate include sodium dibutyl sulfosuccinate, sodium dihexyl sulfosuccinate, and sodium di-2-ethyl hexyl sulfosuccinate. Examples of alkyl ether sulfate include alkyl sulfate triethanolamine salt, and polyoxyethylene alkyl ether sulfate triethanolamine salt. Examples of acyl methyl taurate include sodium N-lauroyl-N-methyl taurate.

Examples of a nonionic surfactant include polyoxyethylene alkyl ether such as polyoxyethylene nonylphenyl ether and polyoxyethylene stearyl ether, polyoxyethylene acyl ester such as polyoxyethylene monostearate, polyoxyethylene sorbitan acyl ester such as polyoxyethylene sorbitan monostearate, and sorbitan ester such as sorbitan laurate.

A water-repellent glass sheet provided with a water-repellent functional film that is coated with a coating film composed of a surfactant was produced in the following manner.

EXAMPLE 1

Sodium di-2-ethyl hexyl sulfosuccinate ("RAPISOLA-30" produced by NOF CORP., anionic surfactant, 30 wt % of solid) was dropped onto a water-repellent glass sheet as described above that has been processed into a predetermined shape and applied thereon with a cotton fabric so that a surfactant coating film was formed thereon.

EXAMPLE 2

A 20% ethyl alcohol solution of polyoxyethylene nonylphenyl ether ("NONION NS-220" produced by NOF CORP., nonionic surfactant, HLB value of 16.0) was dropped onto the same glass sheet as above and applied thereon with a cotton fabric so that a surfactant coating film was formed thereon.

EXAMPLE 3

Sodium polyoxyethylene alkyl ether sulfate ("PERSOFT EDO" produced by NOF CORP., anionic surfactant) was dropped onto the same glass sheet as above and applied thereon with a cotton fabric so that a surfactant coating film was formed thereon.

EXAMPLE 4

A 30% methyl alcohol solution of polyoxyethylene stearyl ether ("NONION S-207" produced by NOF CORP., nonionic surfactant, HLB value of 10.7) was dropped onto the same glass sheet as above and applied thereon with a cotton fabric so that a surfactant coating film was formed thereon.

EXAMPLE 5

A 20% aqueous solution of polyoxyethylene nonylphenyl ether ("NONION NS-202" produced by NOF CORP., nonionic surfactant, HLB value of 5.7) was dropped onto the same glass sheet as above and applied thereon with a cotton fabric so that a surfactant coating film was formed thereon.

EXAMPLE 6

A 5% suspension of sorbitan monolaurate ("NONION LP-20R" produced by NOF CORP., nonionic surfactant, HLB value of 8.6) was dropped onto the same glass sheet as above, applied thereon with a cotton fabric and dried so that a surfactant coating film was formed thereon.

EXAMPLE 7

A 2% aqueous solution of sodium dodecylbenzenesulfonate ("NEWREX POWDER F" produced by NOF CORP., anionic surfactant) was dropped onto the same glass sheet as above, applied thereon with a cotton fabric and dried so that a surfactant coating film was formed thereon.

EXAMPLE 8

Sodium N-lauroyl-N-methyl taurate ("DAIAPON LM" produced by NOF CORP., anionic surfactant, 27 wt % of solid) was dropped onto the same glass sheet as above and applied thereon with a cotton fabric so that a surfactant coating film was formed thereon.

EXAMPLE 9

Alkyl sulfate triethanolamine salt ($ROSO_3HN(C_2H_4OH)_3$, where R is a C10 to C16 alkyl group, "PERSOFT SF-T" produced by NOF CORP., anionic surfactant, 40 wt % of solid) was dropped onto the same glass sheet as above and applied thereon with a cotton fabric so that a surfactant coating film was formed thereon.

EXAMPLE 10

Polyoxyethylene alkyl ester sulfate triethanolamine salt ($RO(C_2H_4O)_nSO_3HN(C_2H_4OH)_3$, where R is a C12 to C16 alkyl group, n≈3, "PERSOFT EF-T" produced by NOF CORP., anionic surfactant, 36 wt % of solid) was dropped onto the same glass sheet as above and applied thereon with a cotton fabric so that a surfactant coating film was formed thereon.

COMPARATIVE EXAMPLE 1

A glass sheet on which only a water-repellent functional film as described above was formed was prepared as Comparative Example 1.

Evaluation of Re-adhesion

A chuck (suction disk) composed of nitrile rubber (produced by Myotoku Ltd.) was pressed tightly to each of the examples prepared as above 10 times. Then, the chuck was pressed tightly to a washed surface of another ordinary glass sheet. Water was applied to the portion of the ordinary glass sheet that was pressed by the chuck, and the level of re-adhesion of the component of the water-repellent agent was evaluated by observing how much the water was repelled. Table 1 shows the results. When Table 1 shows that water-repellency is "not observed", it means that the portion pressed by the chuck exhibited the same level of wettability as that of other portions.

Evaluation of Water-repellent Performance

Furthermore, each of the examples was washed with tap water to remove the surfactant coating film. In all the examples, the surfactant coating films were removed completely.

Thereafter, the examples were dried, and water was applied to the surfaces of the examples. Then, the water-repellent performance of each example was evaluated. Table 1 shows the results. When Table 1 shows that water-repellent performance is "good", it means that the water-repellent performance is the same level as that of Comparative Example 1.

TABLE 1

| Example No. | Water Repellency | Water-repellent Performance |
| --- | --- | --- |
| Ex. 1 | Not observed | Good |
| Ex. 2 | Not observed | Good |
| Ex. 3 | Not observed | Good |
| Ex. 4 | Not observed | Good |
| Ex. 5 | Not observed | Good |
| Ex. 6 | Not observed | Good |
| Ex. 7 | Not observed | Good |
| Ex. 8 | Not observed | Good |
| Ex. 9 | Not observed | Good |
| Ex. 10 | Not observed | Good |
| Com. Ex. 1 | Observed | — |

As seen from the results above, since all the examples have surfactant coating films, the component of the water-repellent agent on the surface of the glass sheet was not re-adhered onto the surface of the ordinary glass sheet. Although the surfactant coating film is adhered onto the surface of the ordinary glass sheet, ordinary washing can remove the surfactant coating film thereon completely.

Furthermore, after the surfactant coating film was removed, the water-repellent performance of all of the examples was equal to that of the water-repellent glass sheet that was not coated with the surfactant coating film. As a result, it was confirmed that there is no adverse effect of the formation of the surfactant coating film on the water-repellent performance.

Handling Method 1

A handling method for handling the water-repellent glass sheet coated with the surfactant coating film as described above with a chuck will be described. As shown in FIG. 1, a chuck 4 is contacted with a surface of the water-repellent glass sheet, and the pressure inside the chuck 4 is reduced by a vacuum source (not shown) so that the water-repellent glass sheet is held. The thus held water-repellent glass sheet can be handled by a robot arm or a person.

In the above-described method, the suction is caused by the vacuum source. The suction can be caused by deforming the chuck mechanically to reduce the pressure.

Application Example on Production Line

A large number of water-repellent glass sheets coated with the surfactant coating films and ordinary glass sheets were on the production line and handled by a robot successively. The chuck was composed of nitrile rubber and was not coated with a coating film.

In this case, the component of the water-repellent agent on the water-repellent glass sheets was not re-adhered to the ordinary glass sheets. Furthermore, the surfactant coating film on the water-repellent glass sheet was adhered to the surface of the chuck, so that a contaminant adhered to the chuck was not adhered onto the surface, especially, of the ordinary glass sheet.

Application of Coating Film onto Handling Tool and Spacing Tool

Next, examples where the coating films are applied onto surfaces of a handling tool and a glass-article-spacing tool in contact with glass articles will be described.

Application Example onto a Chuck

Figure 2:
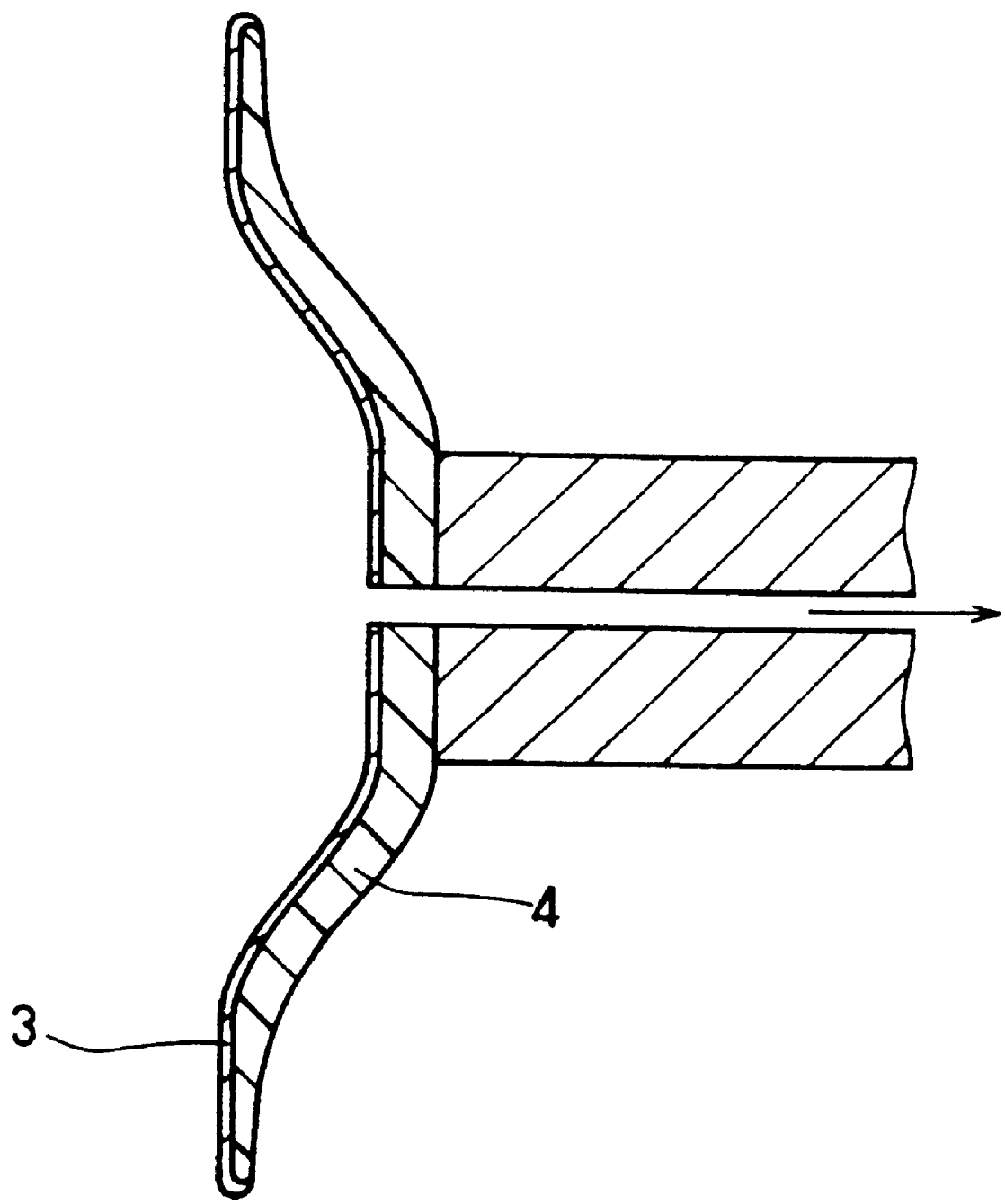
FIG. 2 is a view illustrating a second embodiment of the present invention.

A surfactant coating film was formed on a surface of each of the chucks that were formed of the following substances (see FIG. 2).

The coating film can be formed on the surface of the handling tool in the same manner as formed on the surface of the water-repellent glass article.

EXAMPLE 11

Nitrile Rubber

Sodium di-2-ethyl hexyl sulfosuccinate ("RAPISOLA-30" produced by NOF CORP., anionic surfactant, 30 wt % of solid) was dropped onto a surface of a chuck composed of nitrile rubber (produced by Myotoku Ltd.) and applied thereon with a cotton fabric so that a surfactant coating film was formed thereon.

EXAMPLE 12

Fluorine-based Rubber

Sodium polyoxyethylene alkyl ether sulfate ("PERSOFT EDO" produced by NOF CORP., anionic surfactant) was dropped onto a surface of a chuck composed of fluorine-based rubber (produced by Myotoku Ltd.) and applied thereon with a cotton fabric so that a surfactant coating film was formed thereon.

EXAMPLE 13

Urethane-based Rubber

A 20% methyl alcohol solution of polyoxyethylene nonylphenyl ether ("NONION NS-202" produced by NOF CORP., nonionic surfactant, HLB value of 5.7) was dropped onto a surface of a chuck composed of urethane rubber (produced by Myotoku Ltd.) and applied thereon with a cotton fabric so that a surfactant coating film was formed thereon.

COMPARATIVE EXAMPLE 2

Nitrile Rubber (Without a Surfactant Coating Film)

A chuck composed of nitrile rubber as described above was prepared as Comparative Example 2.

Evaluation of Re-adhesion

Each of the thus produced chucks was pressed tightly to the water-repellent glass sheet as described above 10 times. Then, the chuck was pressed tightly to a washed surface of another ordinary glass sheet. Then, water was applied to the portion of the ordinary glass sheet that was pressed by the chuck, and the level of re-adhesion of the component of the water-repellent agent was evaluated by observing how much the water was repelled. Table 2 shows the results. When Table 2 shows that water-repellency is "not observed", it means that the portion pressed by the chuck exhibited the same level of wettability as that of other portions.

Evaluation of Water-repellent Performance

Furthermore, the water-repellent glass sheet pressed by the chuck was washed with tap water to remove the surfactant coating film adhered thereon. In all the water-repellent glass sheet samples used in the examples, the surfactant coating films were removed completely.

Thereafter, the samples were dried, and water was applied to the surfaces of the examples. Then, the water-repellent performance of each sample was evaluated. Table 2 shows the results. When Table 2 shows that water-repellent performance is "good", it means that the water-repellent performance is the same level as that of other portions.

TABLE 2

| Example No. | Water Repellency | Water-repellent Performance |
| --- | --- | --- |
| Ex. 11 | Not observed | Good |
| Ex. 12 | Not observed | Good |
| Ex. 13 | Not observed | Good |
| Com. Ex. 2 | Observed | — |

As seen from the results above, since all the examples have surfactant coating films, the component of the water-repellent agent on the surface of the glass sheet was not re-adhered onto the surface of another ordinary glass sheet via the chuck. Although the surfactant coating film is adhered onto the surface of the ordinary glass sheet, ordinary washing can remove the surfactant coating film thereon completely.

Furthermore, after the surfactant coating film adhered to a portion pressed by the chuck was removed, the water-repellent performance of the portion of the water-repellent glass sheet was equal to that of other portions. As a result, it was confirmed that there is no adverse effect of the adhesion of the surfactant coating film on the water-repellent performance.

Handling Method 2

A handling method for handling glass sheets with the chuck coated with the surfactant coating film as described above will be described. A chuck 4 having the coating film 3 as shown in FIG. 2 is contacted with a surface of a glass sheet, and the pressure inside the chuck is reduced by a vacuum source (not shown) so that the glass sheet is held. The thus held water-repellent glass sheet can be handled by a robot arm or a person. The suction can be caused by deforming the chuck mechanically.

Since the surfactant coating film formed on the surface of the chuck is removed upon use, it is desirable to coat the surface with the surfactant coating film again.

Application Example onto a Spacing Tool

Figure 3:
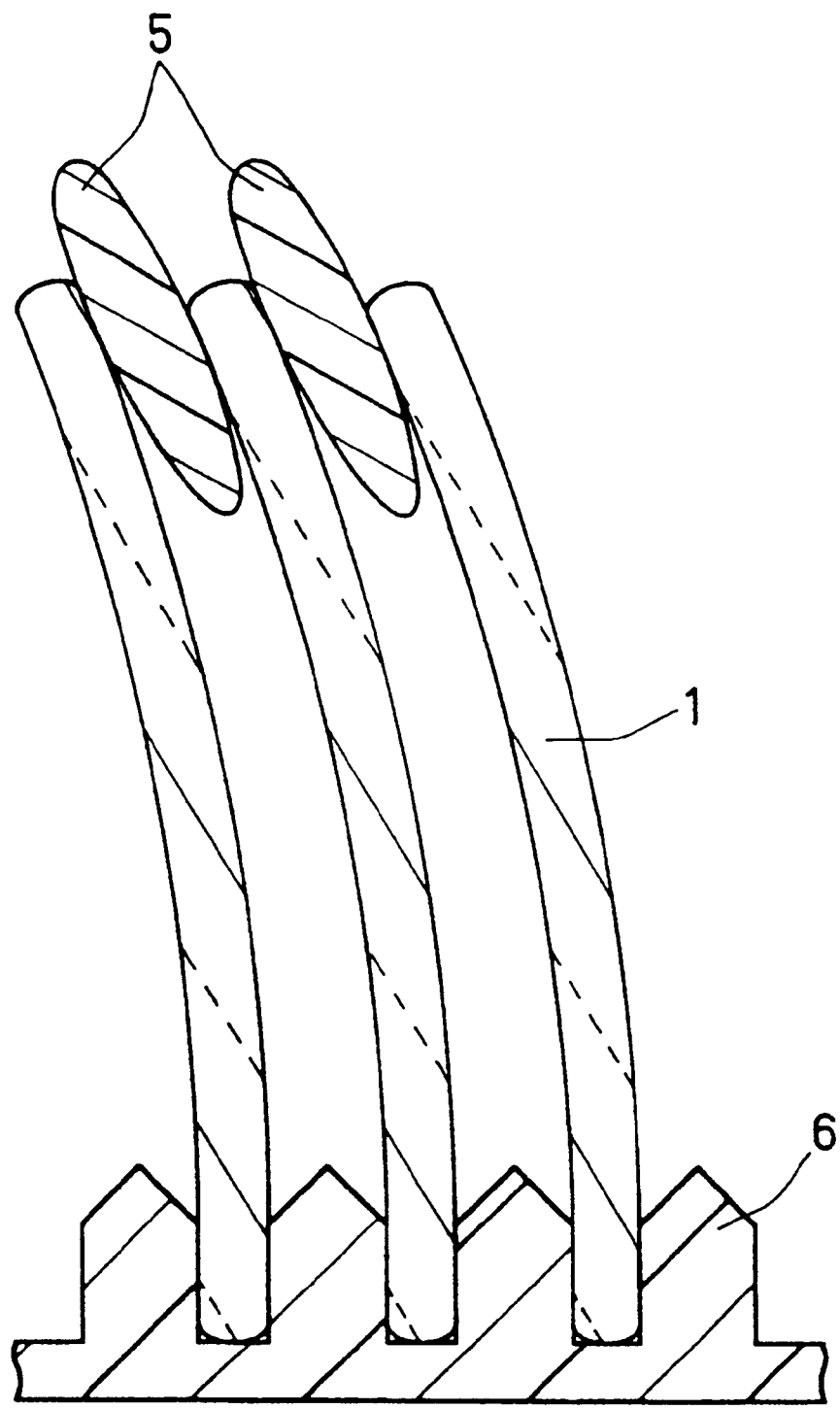
FIG. 3 is a schematic view illustrating third and fourth embodiments of the present invention.
Figure 4:
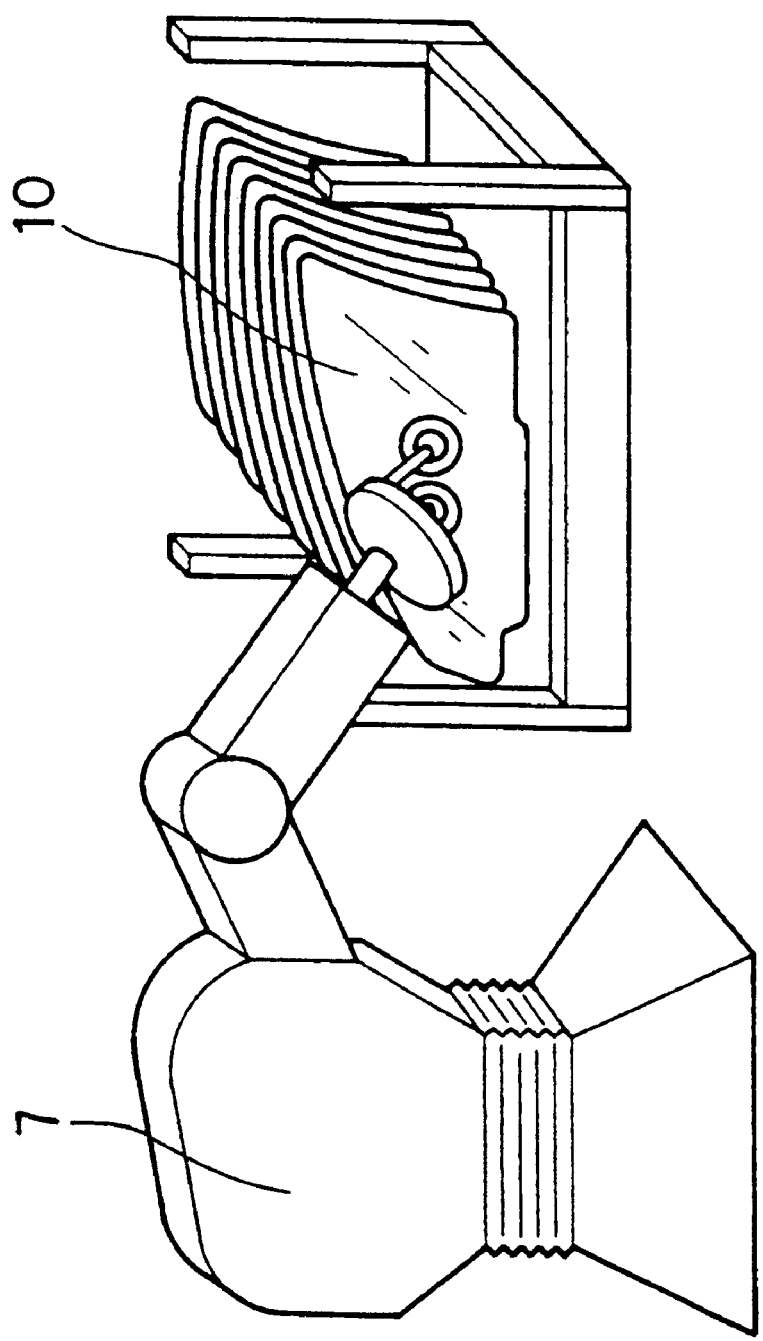
FIG. 4 is a schematic view showing the manner a robot handles a glass sheet.

A comb 6 and a spacer 5 were produced of the same rubber materials as those of the chucks in the examples as spacing tools for retaining the interval between glass sheets (see FIG. 3). In the same manner as above, the surfactant coating films were formed on the spacing tools, and the re-adhesion of the component of the water-repellent agent was investigated.

The results were that the component of the water-repellent agent was not re-adhered to another glass sheet via the spacing tools.

Handling Method 3

Glass sheets are stored and transported by using the combs and spacers coated with the surfactant coating films as described above.

INDUSTRIAL APPLICABILITY OF THE INVENTION

As described above, the present invention can prevent a component of an organic functional film on a glass article from adhering to an article in contact with the glass article and adhering to another article in contact with the article.

What is claimed is:

1. A glass article for using as a window glass,
   the glass article being provided with a water repellant film on a surface thereof,
   wherein a coating film removable with water is formed on at least a portion of the water repellant film.

2. The glass article according to claim 1, wherein the coating film is formed by applying a compound soluble in water.

3. The glass article according to claim 1, wherein the coating film is formed by applying a surfactant.

4. The glass article according to claim 3, wherein the surfactant is selected from the group consisting of an anionic surfactant and a nonionic surfactant.

5. A method for handling a glass article provided with a water repellant film on a surface thereof with a handling tool,
   wherein the glass article is handled with the handling tool via a coating film, which is removable with water, between a surface of the tool in contact with the water repellant film and the water repellant film.

6. The method for handling a glass article according to claim 5, wherein the coating film is formed on the water repellant film.

7. The method for handling a glass article according to claim 5, wherein the coating film is formed on the surface of the tool in contact with the water repellant film.

8. The method for handling a glass article according to claim 5, wherein the coating film is formed by applying a compound soluble in water.

9. The method for handling a glass article according to claim 5, wherein the coating film is formed by applying a surfactant.

10. The method for handling a glass article according to claim 9, wherein the surfactant is selected from the group consisting of an anionic surfactant and a nonionic surfactant.

11. A method for handling a plurality of glass articles successively with a handling tool,
    wherein some of the plurality of glass articles are provided with water repellant films on surfaces thereof, and a coating film removable with water is formed on each of the water repellant films, and
    the glass articles are handled with a handling tool while allowing the coating film to adhere to a surface of the handling tool to prevent a contaminant brought to the surface of the handling tool from the water repellant film from adhering to the other glass articles.

12. The method for handling a glass article according to claim 11, wherein the coating film is formed by applying a compound soluble in water.

13. The method for handling a glass article according to claim 11, wherein the coating film is formed by applying a surfactant.

14. The method for handling a glass article according to claim 13, wherein the surfactant is selected from the group consisting of an anionic surfactant and a nonionic surfactant.

15. A glass-article-handling tool, wherein a coating film removable with water is formed on a surface of a member for contacting with a glass article.

16. The glass-article-handling tool according to claim 15, wherein the member includes a suction function.

17. The glass-article-handling tool according to claim 15, wherein the coating film is formed by applying a compound soluble in water.

18. The glass-article-handling tool according to claim 15, wherein the coating film is formed by applying a surfactant.

19. The glass-article-handling tool according to claim 18, wherein the surfactant is selected from the group consisting of an anionic surfactant and a nonionic surfactant.

20. A glass-article-spacing tool, wherein a coating film removable with water is formed on a surface of a member for contacting with a glass article.

21. The glass-article-spacing tool according to claim 20, wherein the coating film is formed by applying a compound soluble in water.

22. The glass-article-spacing tool according to claim 20, wherein the coating film is formed by applying a surfactant.

23. The glass-article-spacing tool according to claim 22, wherein the surfactant is selected from the group consisting of an anionic surfactant and a nonionic surfactant.

24. A method for handling a plurality of glass articles successively with a handling tool, wherein some of the plurality of glass articles are provided with organic functional films on surfaces thereof, and a coating film removable with a solvent is formed on each of the organic functional films by applying a surfactant, and the glass articles are handled with a handling tool while allowing the coating film to adhere to a surface of the handling tool to prevent a contaminant brought to the surface of the handling tool from the organic functional film from adhering to the other glass articles.

25. The method for handling a glass article according to claim 24, wherein the organic functional film is substantially insoluble in the solvent.

26. The method for handling a glass article according to claim 24, wherein the plurality of glass articles include glass articles provided with the organic functional films and glass articles not provided with organic functional films.

27. The method for handling a glass article according to claim 24, wherein the surfactant is selected from the group consisting of an anionic surfactant and a nonionic surfactant.

28. The method for handling a glass article according to claim 24, wherein the organic functional film is water-repellent.

29. A glass-article-handling tool, wherein a coating film removable with a solvent is formed on a surface of a member for contacting with a glass article by applying a surfactant.

30. The glass-article-handling tool according to claim 29, wherein the member includes a suction function.

31. The glass-article-handling tool according to claim 29, wherein the surfactant is selected from the group consisting of an anionic surfactant and a nonionic surfactant.

32. A glass-article-spacing tool, wherein a coating film removable with a solvent is formed on a surface of a member for contacting with a glass article by applying a surfactant.

33. The glass-article-spacing tool according to claim 32, wherein the surfactant is selected from the group consisting of an anionic surfactant and a nonionic surfactant.

* * * * *